US008549545B2

(12) United States Patent
Ashwood et al.

(10) Patent No.: US 8,549,545 B2
(45) Date of Patent: *Oct. 1, 2013

(54) ABSTRACTION OF COMPUTER DISK IMAGE CLONING CAPABILITIES FROM BOOTABLE MEDIA

(75) Inventors: Brett Ashwood, Prospect, CT (US); Gregory Jensen Boss, American Fork, UT (US); Rick Allen Hamilton, II, Charlottesville, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,698

(22) Filed: Jul. 18, 2012

(65) Prior Publication Data

US 2012/0284500 A1    Nov. 8, 2012

Related U.S. Application Data

(63) Continuation of application No. 11/469,495, filed on Sep. 1, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/321

(58) Field of Classification Search
USPC ........................................................ 719/321
See application file for complete search history.

(56) References Cited

U.S. PATENT DOCUMENTS

| 5,784,611 A | 7/1998 | Thantrakul |
| 5,854,905 A | 12/1998 | Garney |
| 5,940,623 A | 8/1999 | Watts et al. |
| 6,138,178 A | 10/2000 | Watanabe |
| 6,401,183 B1 | 6/2002 | Rafizadeh |
| 6,449,735 B1 | 9/2002 | Edwards et al. |
| 6,594,743 B1 | 7/2003 | Chen et al. |

(Continued)

OTHER PUBLICATIONS

Disk EMU (dated Mar. 29, 2005). [online]. 7 pages. [retrieved from the Internet Jun. 1, 2010]. Retrieved from the Internet: < URL: http:web.archive.org/web/20050329013334/http://www.nu2.nu/diskemu/ >.

(Continued)

*Primary Examiner* — Andy Ho
*Assistant Examiner* — Timothy A Mudrick
(74) *Attorney, Agent, or Firm* — Schmeiser, Olsen & Watts, LLP; Mark Vallone

(57) ABSTRACT

A computer system and computer program product for implementing a method for configuring an improved computing system containing a first computing device. The method includes: creating a logical layer and a physical layer within the first computing device; installing a software operating system (OS) in the logical layer of the first computing device; configuring a first basic input/output system (BIOS) based on installation in the physical layer of the first computing device; relocating all first hardware device drivers for the first hardware devices from an OS image in the logical layer to a first Electrically Erasable Programmable Read-Only Memory (EEPROM) in the physical layer of the first computing device; installing the first BIOS in the physical layer of the first computing device; and loading the first hardware device drivers from the first EEPROM into the first BIOS during a boot phase for the first computing device.

20 Claims, 5 Drawing Sheets

(56) References Cited

U.S. PATENT DOCUMENTS

| | | |
|---|---|---|
| 2002/0199044 A1 | 12/2002 | Futterman |
| 2003/0065913 A1 | 4/2003 | Cepulis et al. |
| 2003/0097581 A1 | 5/2003 | Zimmer |
| 2003/0200354 A1 | 10/2003 | Jaffrey |
| 2004/0019778 A1 | 1/2004 | Gere |
| 2004/0025002 A1 | 2/2004 | Cepulis et al. |
| 2004/0179285 A1 | 9/2004 | Ogasawara et al. |
| 2004/0221146 A1 | 11/2004 | Baumann |
| 2005/0027831 A1 | 2/2005 | Anderson et al. |
| 2005/0149713 A1 | 7/2005 | Rothman et al. |
| 2007/0005947 A1 | 1/2007 | Chartrand et al. |
| 2008/0126772 A1 | 5/2008 | Ashwood et al. |

OTHER PUBLICATIONS

Bart's Preinstalled Environment (dated Mar. 31, 2005). [online]. 10 pages. [retrieved from the Internet Jun. 1, 2010]. Retrieved from the Internet: < URL: http:web.archive.org/web/2005031090824/http://www.nu2.nu/pebuilder/ >.

Office Action (Mail Date Oct. 27, 2009) for U.S. Appl. No. 11/469,495, filed Sep. 1, 2006; Confirmation No. 6537.

Amendment filed Jan. 25, 2010 in response to Office Action (Mail Date Oct. 27, 2009) for U.S. Appl. No. 11/469,495, filed Sep. 1, 2006; Confirmation No. 6537.

Final Office Action (Mail Date Apr. 4, 2010) for U.S. Appl. No. 11/469,495, filed Sep. 1, 2006; Confirmation No. 6537.

Amendment after Final filed Jun. 1, 2010 in response to Final Office Action (Mail Date Apr. 6, 2010) for U.S. Appl. No. 11/469,495, filed Sep. 1, 2006; Confirmation No. 6537.

Advisory Action (Mail Date Jun. 11, 2010) for U.S. Appl. No. 11/469,495, filed Sep. 1, 2006; Confirmation No. 6537.

Request for Continued Examination filed Jul. 6, 2010 for U.S. Appl. No. 11/469,495, filed Sep. 1, 2006; Confirmation No. 6537.

Office Action (Mail Date Dec. 8, 2010) for U.S. Appl. No. 11/469,495, filed Sep. 1, 2006; Confirmation No. 6537.

Amendment filed Mar. 8, 2011 in response to Office Action (Mail Date Dec. 8, 2010) for U.S. Appl. No. 11/469,495, filed Sep. 1, 2006; Confirmation No. 6537.

Office Action (Mail Date May 26, 2011) for U.S. Appl. No. 11/469,495, filed Sep. 1, 2006; Confirmation No. 6537.

Amendment filed Aug. 24, 2011 in response to Office Action (Mail Date May 26, 2011) for U.S. Appl. No. 11/469,495, filed Sep. 1, 2006; Confirmation No. 6537.

Final Office Action (Mail Date Dec. 7, 2011) for U.S. Appl. No. 11/469,495, filed Sep. 1, 2006; Confirmation No. 6537.

Request for Continued Examination and Amendment filed Feb. 10, 2012 in response to Final Office Action (Mail Date Dec. 7, 2011) for U.S. Appl. No. 11/469,495, filed Sep. 1, 2006; Confirmation No. 6537.

Notice of Allowance (Mail Date May 9, 2012) for U.S. Appl. No. 11/469,495, filed Sep. 1, 2006; Confirmation No. 6537.

ABSTRACTION OF COMPUTER DISK IMAGE CLONING CAPABILITIES FROM BOOTABLE MEDIA

This application is a continuation application claiming priority to Ser. No. 11/469,495, filed Sep. 1, 2006.

FIELD OF THE INVENTION

The present refers to a method and system for constructing a computing device and in particular to a method and system for reconfiguring the structure of a computing device such that the Basic Input/Output System (BIOS) of the computing device is positioned in a physical layer of the computing device to facilitate more efficient installation and operation of computing software.

BACKGROUND OF THE INVENTION

The process of "building a computer" involves the combining of hardware components and software components into one configuration that operates as a single unit to perform desired computing tasks. For the purposes of this discussion, the focus is on building a computer as it relates to the software components. This discussion and description focus on building a computer as it relates to the software components required in the computer. As a result, this discussion will not address the prerequisite process of actually assembling hardware components (disks, mother boards, CPU's graphics cards, monitors, keyboards, etc).

With regard to the construction and installation of software components, building a computer therefore involves the basic steps of:

1. Configuring a Basic Input/Output System (BIOS) to understand what hardware is present in the computer and how to interact with that hardware.
2. Booting from external media to the machine (a floppy disk, CD-ROM, USB RAM Device, USB HDD, USB CD-ROM, external Network PXE type device, etc).
3. Loading device drivers to support various hardware components and also the partitioning of a disk or array of disks in the computer.
4. Formatting the disks.
5. Running a program, which kicks off or initiates an installation of an operating system that copies and extracts pertinent files from a primary media source and in some instances, another wholly separate media source.

The Basic Input/Output System (BIOS) is built-in software that determines what a computer can do without accessing programs from a disk. On personal computers, the BIOS contains all the code required to control the keyboard, display screen, disk drives, serial communications, and a number of miscellaneous functions. Many modern PCs have a flash BIOS, which means that the BIOS has been recorded on a flash memory chip, which can be updated if necessary. The PC BIOS is fairly standardized, so all PCs are similar at this level (although there are different BIOS versions). Additional DOS functions are usually added through software modules. These additions one can upgrade to a newer version of DOS without changing the BIOS.

The BIOS runs an off onboard PROM, EPROM or most commonly, flash memory when the computer is powered on and it initializes and sometimes performs diagnostic tests on the hard drive, memory, video, chipset and other hardware. Subsequently, it typically decompresses itself from the BIOS memory space into the system's main memory and starts executing from there. Nearly all BIOS implementations can optionally execute a setup program interfacing the nonvolatile BIOS memory (CMOS). This memory holds user-customizable configuration data (time, date, hard drive details, etc.) assessed by BIOS code.

Referring to the previously mentioned first step of building a computer, configuring a BIOS in order for a computer to execute a software program, it is necessary to communicate with several layers in the computer hardware. In this communication process, the computer operating system (software) has to communicate with the Basic Input/Output System (BIOS) level of the computer. This BIOS level has the capability to interact with any of the hardware devices in the computer. As a result, all communication with the hardware is facilitated through the BIOS level. In the traditional legacy computer method, device drivers are needed for the operating system to talk to the hardware devices. The device driver is a transport component that allows the operating system to interface with each piece of the computer hardware. Subsequently, each hardware device would have a device driver associated with it. In the traditional legacy system, in order to install an operating system, often it is necessary to extensively search for outdated and antiquated device drivers to make an operating system accurately operate. This legacy method is not an efficient way to install an operating system regardless of the type of system.

In addition to the problems associated with the use of device drivers in the installation of operating system software, other aspects also exist beyond the installation of the operating system software. The computer building process is similar from one type of computer to another, but it is usually never the same unless every hardware component within the computer is identical. This means that for each nonidentical computer a different set of drivers and often different boot media must be used to partition and format the disk drivers. This process can become a very time consuming process for environments that often rebuild computers or that often have more than a few computers. Data centers, technology laboratories, hosting services on the Internet, and even many home users fall into this category of having many computers. Furthermore, the purpose of a computer may dictate the need to rebuild often. This rebuilding situation can be the case in a lab or testing environment, and educational courses and classrooms. Other events will require rebuilds including badly infected systems containing spy ware or viruses, hardware failures or even high utilization of computers.

Today, there are several software program products that aid a user in building a computer. Software products that allow a user to clone, copy, restore, and otherwise partition disk drives include Symantec Ghost, Powerquest Drive Image (now owned by Symantec), HD Clone, Ranish, MS Automated Deployment Services, Acronis Disk Director ands many others. What is common about these tools is that a special boot media is required that specifically supports the hardware in the computer one wants to manipulate and this requires searching for and acquiring drivers for specific disk drives, network cards, boot media and sometimes kernel drivers in order to successfully boot media and sometimes kernel drivers in order to successfully boot, partition, format, and install the OS. Many times the drivers are hard to locate and if they are available it is a very time consuming process. Then the specific drivers often become out of date or back-leveled, and need to be updated and for each nonidentical computer separate media must be maintained.

Others efforts have attempted to make this a less painful process by creating bootable CD-ROM's which contain virtual disk images that in turn can be loaded depending on which computer and which tasks one wants to accomplish.

One such example is Bart's Modboot, BootCDm and PE builder found at http://www.nu2.nu. This approach only addresses the problem of maintaining a single image that would support all the computers a user works with on a regular basis. It does not address the up-front time consumed in finding the drivers, compiling the boot media and updating the back-leveled drivers. It is simply an organizational tool.

Other methods involve partitioning subsequent disks after an Operating System is already installed. In today's world, it is becoming more common to have multiple operating systems on a single physical computer. These can be referred to as logical partitions or LPAR's or as nodes. Hardware platforms such as IBM's i-Series and p-Series contain this ability to create LPAR's but, in order for an image to be duplicated, a master image must exist first so that all the steps above are still required when the computer is initially built.

Applications using network methods such as TFTP, PXE, NFS, FTP, and others to install an operating system via the network, have made the install process less difficult. Products like Redhat's Kiskstart, System Imager, SuSE Yast, AIX NIM, among sundry others, all demonstrate the ability to perform network OS installation but only for a particular flavor of a Unix or Microsoft Window's operating system. However, these application and network methods to access remote systems still require attention to specific drivers used to contact the remote server systems. Issues of new-to-market hardware for network cards and other boot device often hinder the ability to use such network OS installation methods reliably in small to large scale hosting environments.

There remains a need for a method and system in which device drivers are positional in a computing device such that the task of locating drivers for specific hardware drivers is substantially simplified. There also remains a need for a reconfigurable computing device in which the Basic Input/Output System can more easily locate and communicate with computer hardware device drivers.

SUMMARY OF THE INVENTION

In the present invention, a computer has a configuration in which hardware drivers would be moved out of the operating system level, which is the conventional computer configuration. The drivers would be embedded in the BIOS layer of the computer configuration. In this new configuration, the operating system would communicate directly with the BIOS. The BIOS would have the drivers to communicate directly with the hardware components in the computer. This new configuration would eliminate one major step in building a computer. In addition, without this step, the construction of the computer would be faster.

The present invention further provides an improved computing system having a first computing device. This configuration of this first computing device has a logical layer having operating system software for controlling tasks and operating conducted in the computer and software application programs for performing specific tasks within the computer system. The configuration also has a physical layer having a series of hardware components, a sever platform, an input/output system and a series of device drivers embedded in said input/output system, the device drivers facilitating the communication between the operating system and said hardware devices. The invention provides a system, which can facilitate a more efficient computer construction process. The invention further provides system in which a computer configuration contains a BIOS layer, which contains device drivers. The invention has device drivers embedded in the BIOS layer of the computer to communicate directly with the hardware components.

This invention also involves removing the requirements to have specific hardware drivers and associated boot media in order to accomplish partitioning and formatting tasks needed in the build process to build a computer from a cloned image. The novelty of this invention is performed by decoupling Operating System specific network/boot device drivers from the installer application, and instead putting the functionality at a lower, logical level within the BIOS chipset.

For example, in AIX and LINUX, in order to clone, one has to pre-install all the device drivers required, for the other server, before one clone the disk. Once cloned, the disk can be manually installed and booted normally. Of course this applies for situations where the hardware is obsolete and the user wants to just move a disk, which might not be supported. Also, this would work well if booting from a SAN was a requirement, where the OS "boot disk" is a LUN on a SAN attached storage array, where there would be no physical disk hardware. In this situation, decoupling the drivers from the image and putting in the BIOS chip, or some other dedicated location on processor/mother board would make a server refresh almost trivial. A method to refresh the "Driver BIOS" would be to have a process automatically sense when a new device has been added. That process would then load the drivers from the device itself in the newly added device (Ethernet, fibre, etc).

The implementation of the method and system of the present invention provides some key advantages over the conventional computer configuration and the conventional method of computer construction. These advantages are:
  The ability to duplicate any operating system without specific, customized boot media
  The ability to perform key partitioning operations without any boot media
    1. Cloning partitions from disk to disk
    2. Cloning partitions within the same disk
  Decoupling drivers from OS or OS image and storing and maintaining in hardware firmware or BIOS obviates the need to prepare specialized OS images built for particular server platform and hardware device types.

DETAILED DESCRIPTION OF THE INVENTION

Figure 1:
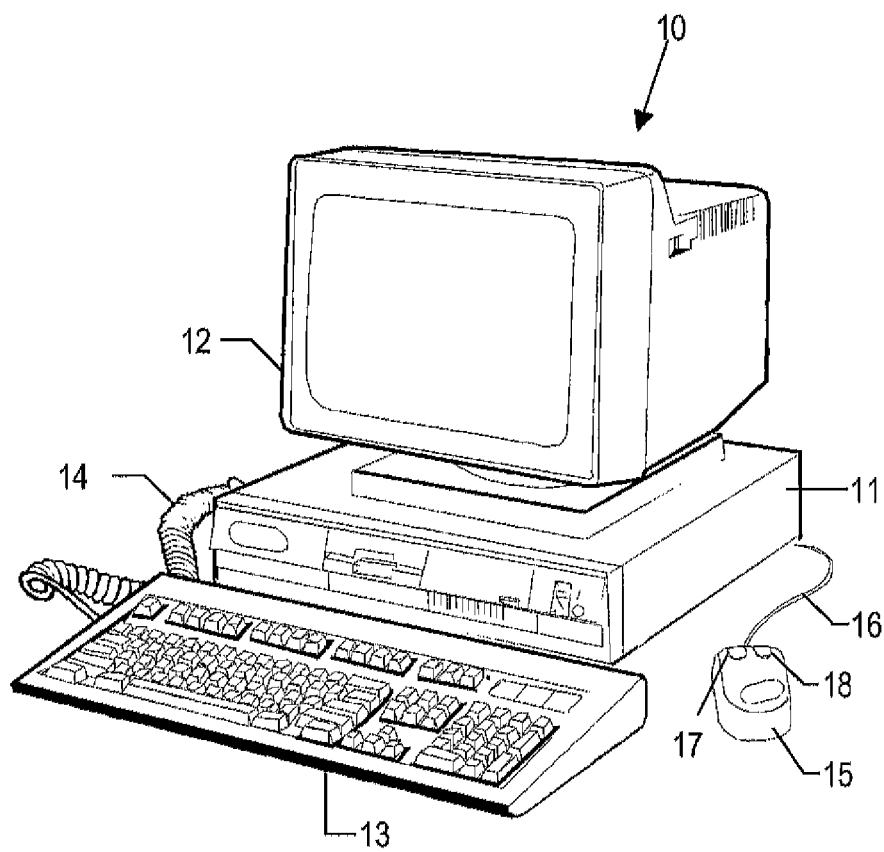
FIG. 1 is a conventional computing device used that can be used to transmit and receive electronic messages via a computer network.

The majority of electronic data transmissions and computerized transactions including completion and transmission of electronic forms occur over computing devices, usually personal computers, connected to a communication network. With reference now to FIG. 1, there is depicted a pictorial representation of computing device 10 which may be used in implementation of the present invention. As may be seen, data processing system 10 includes processor 11 that preferably includes a graphics processor, storage device or medium, memory device and central processor (not shown). The storage device or medium may contain program code configured to be executed by the processor 11 via the memory to implement methods of the present invention. Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The access to web pages and the transmission of data via web pages usually occurs via a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
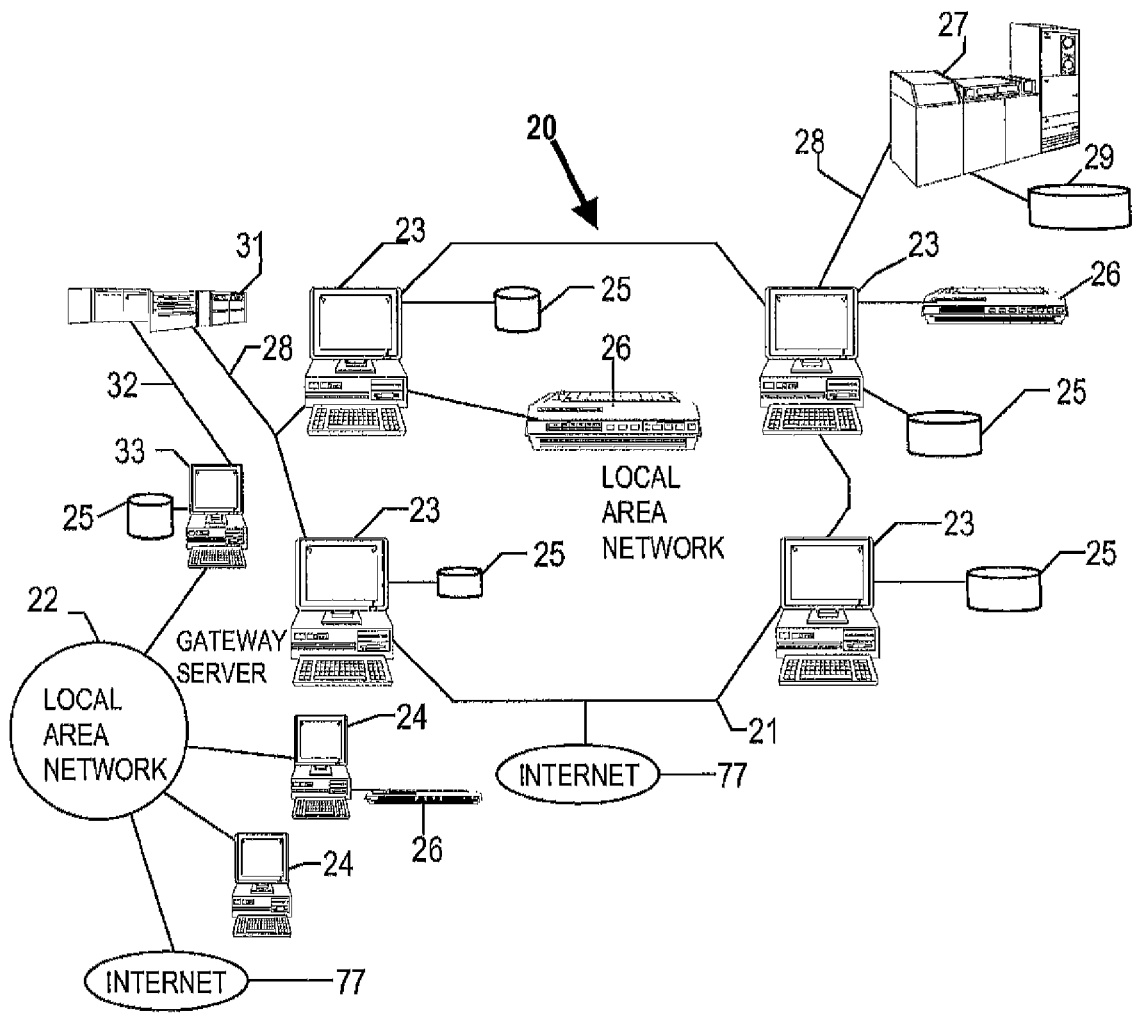
FIG. 2 is a diagram of a computer network over which electronic messages may be transmitted between a sender and receiver in the present invention.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21.

Figure 3:
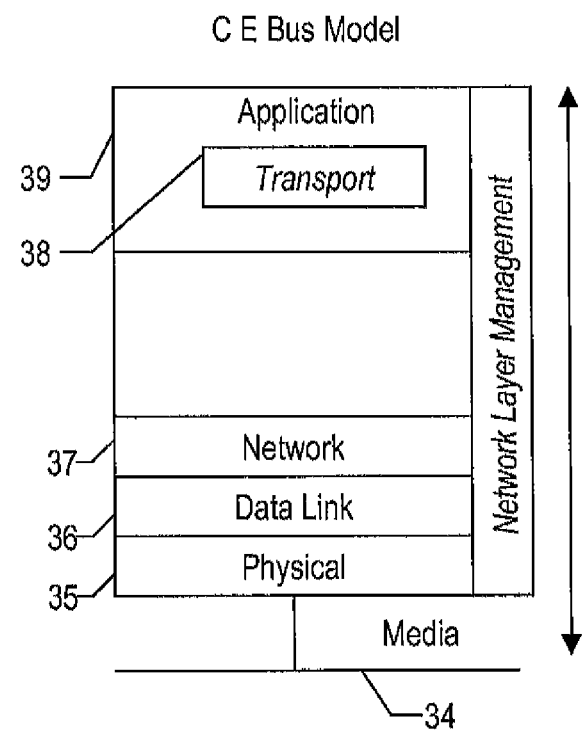
FIG. 3 is an illustration for the purpose of example of the communication model of a computing device.

FIG. 3 is an illustration for the purpose of example of the Consumer Electronic Bus) CEBus Layered Model. It is a standard, much like the OSI (Open Systems Interconnection) Model, in that it illustrates the layer of communication from the physical layer (via physical connection to a media source) up the logical layers above the previous layer (via the network management) to the top level application layer into an application that makes sense of the information being transferred. Smart embedded devices in the Consumer Electronic Industry follow this standard. In fact many devices do not need to contain all logical levels within themselves within a single chip or component. The different required layers can span over components before the physical layer connects to a network medium. In this model, shown in FIG. 3, media 34 represents the wiring going out from the model. The physical layer 35 is the connection of a device to an electronic network. The data link layer 36, network layer 37, transport layer 38 and application layer 39 represent a standard of how information is communicated from a physical device down to logical data that is traced back to an application that talks to that model.

Figure 4:
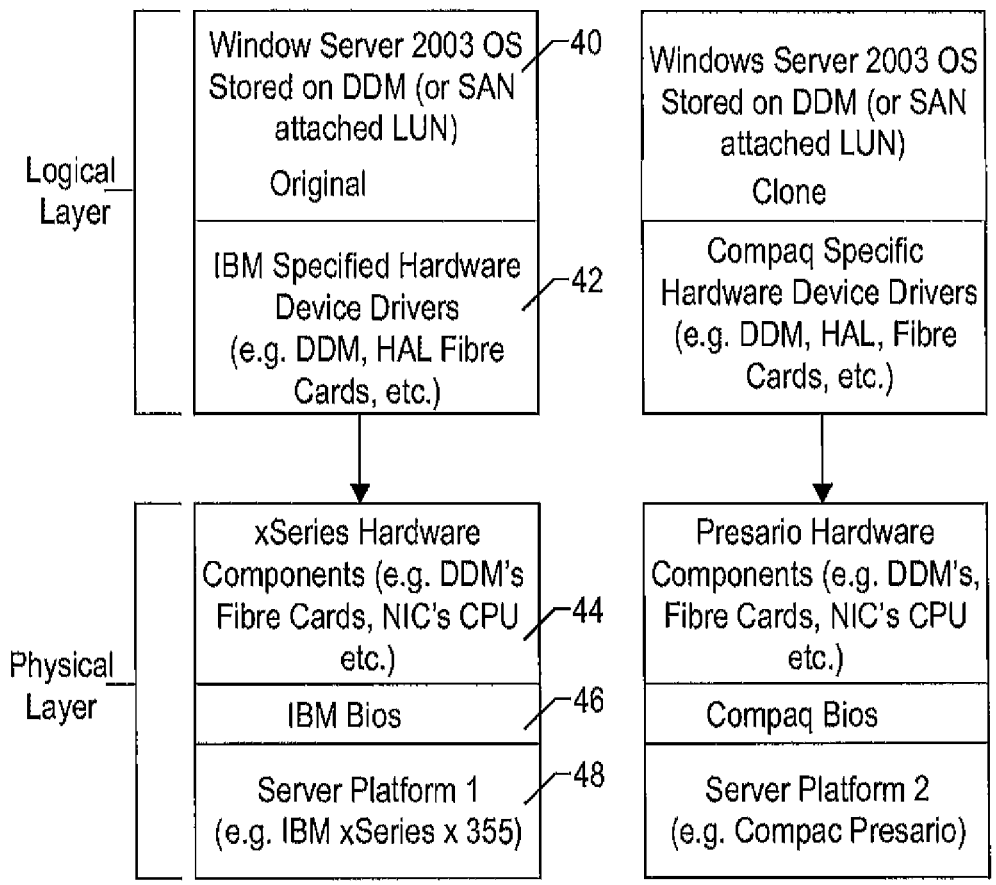
FIG. 4 is an illustration of the structural configuration of a computer system and a clone of the computer system as configured in the conventional legacy method.

FIG. 4 is an illustration of the structural configuration of a computer system and a clone of the computer system as configured in the conventional legacy method. This figure shows two computer configurations. In this example, one configuration is the original computer and the other configuration is a clone of the original computer. In the legacy method, the OS image 40 resides in the logical layer of the computer. This OS image contains as part of the image, the device drivers 42 required to interface correctly with the hardware specific components. The logical layer connects to the hardware 44 in the physical layer through the device drivers as depicted in FIG. 4. Once commands are sent through the hardware components they interact through the BIOS 46. The BIOS of firmware then allows commands to pass to the actual platform hardware 48. Responding communications are sent back through the physical and logical stack. Thus, in order to clone or migrate to another hardware platform type by perhaps a different vendor, a new OS image is needed that has the new required device drivers, e.g. IBM xSeries to Compaq Presario.

Figure 5:
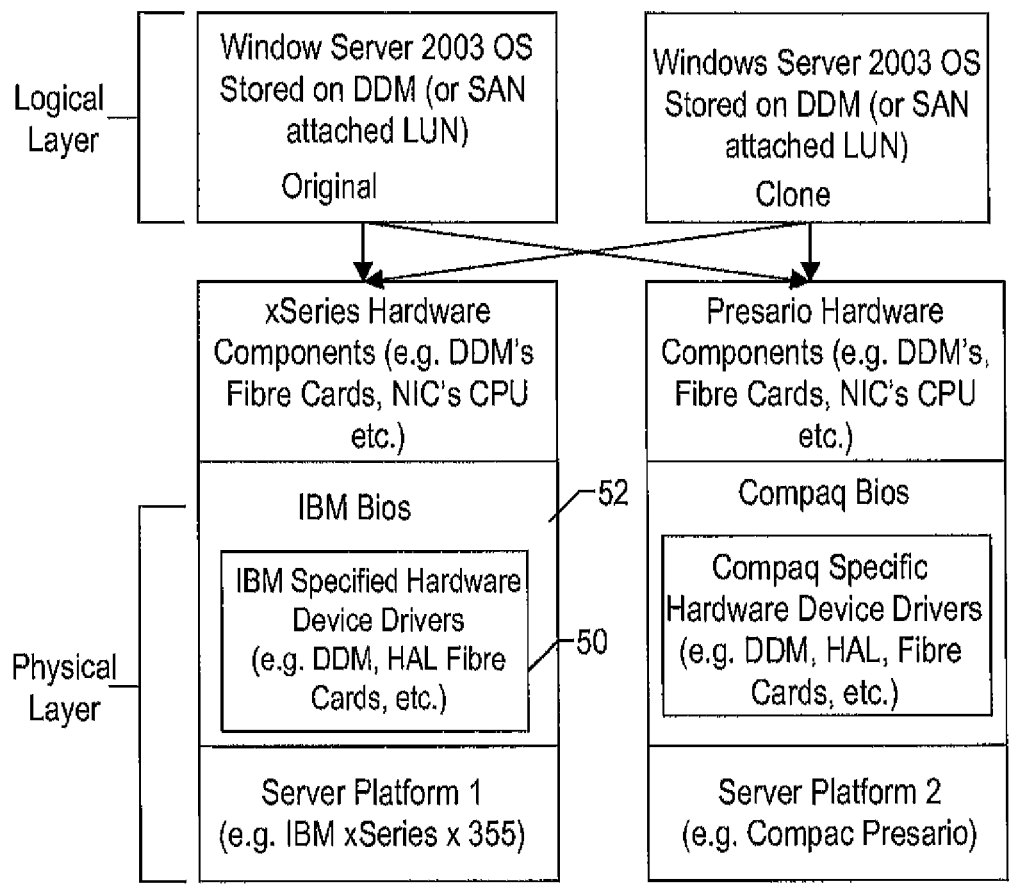
FIG. 5 is an illustration of the structural configuration of a computer system and a clone of the computer system as configured in the method of the present invention.

In the new method and configuration noted herein, the device drivers are relocated from the OS image itself and are moved to the BIOS itself contained in the hardware, by utilizing an EEPROM (Electrically Erasable Programmable Read-Only Memory) device connected directly to the BIOS chipset in the hardware platform in a preferred embodiment. The following FIG. 5 teaches this new method and configuration for device driver containment in the BIOS layer of the computer.

In the EEPROM method, the device drivers 50 are loaded "logically" into the BIOS 52 and contain all the platform and device driver specific information required to pass OS level commands through to the various hardware components. The advantage of such a configuration is that the OS image is truly portable. The device specific aspects of an OS image that require it be re-loaded onto a new platform have been obviated. In the new method described herein, the device driver specific information is loaded from the EEPROM attached to the BIOS during the boot phase. Any new hardware components that are added to the server platform, such as a new NIC or Fibre card, are added at the BIOS level and appropriate device driver information is loaded into the EEPROM attached to the BIOS. Likewise, any new device driver updates that are required would be instead placed into the EEPROM as opposed to the OS image itself. In the initial configuration, the BIOS level will contain device drivers for each hardware component in the computer. As a result, regardless of the hardware installed on the computer, the BIOS level will know what device driver to apply to the specific hardware component. There will be no need to search for device drivers to use with the operating system in the computer.

In the computing system of the present invention, the logical layer is configured containing the operating system software and other software programs. In this new configuration, the logical layer does not contain the Device Drivers as shown in the legacy configurations of FIG. 4. The configuration of the physical layer comprises the assembling of all of the hardware devices for the computer, the sever platform, and the input/output system (BIOS). Also, as previously discussed, an appropriate device driver for each hardware device is incorporated into the physical layer.

In the operation of the new computer configuration described herein,

Currently, some software systems attempt to accomplish the process of the present invention using software. However, a disadvantage with a software approach to this task is that that process still has to search for device drivers.

The present also has advantages especially in the computer cloning process. Cloning may be desired when there is a system of ten computers and there is a desire to install an operating system on each of the ten system computers. In this process, a computer operating system image may be installed on one system and propagated to the other nine computers such that each computer has the exact same operating system. This cloning process eliminates the need to manually do ten steps to have the operating system on each computer.

In specific, when one goes to clone an operating system, the cloning software has to interface with the hardware device peripherals and in particular a hard drive that is part of the installation process. This installation process requires device drivers to be loaded on the hard drive at specific times to allow communication between the hardware device and the installing software. These device drivers would need to be loaded prior to the performing the cloning activity. With the present invention, there would be no need to install device drivers. The cloning software would talk to the BIOS, which would have the device drivers for that system. This process would increase the efficiency in the computer cloning process.

It is important to note that while the present invention has been described in the context of a fully functioning data processing system, those skilled in the art will appreciate that the processes of the present invention are capable of being distributed in the form of computer readable program code comprising instructions in a computer readable storage device or medium and a variety of other forms, regardless of the particular type of storage device or medium or used to carry out the distribution. Examples of computer readable storage devices or media include EPROM, ROM, tape, paper, floppy disc, hard disk drive, RAM, and CD-ROMs. The program code may be executed by a processor of a computer system (FIG. 1) to implement methods of the present invention.

We claim:

1. A computer system comprising a processor, a memory, and a computer readable storage device, said storage device containing program code configured to be executed by the processor via the memory to implement a method for configuring an improved computing system containing a first computing device, said method comprising:

creating a logical layer and a physical layer within the first computing device;

installing a software operating system (OS) in the logical layer of the first computing device;

configuring a first basic input/output system (BIOS) based on installation in the physical layer of the first computing device, said configuring the first BIOS being based on first hardware devices determined to be present in the first computing device and based on determined ways to interact with the first hardware devices;

relocating all first hardware device drivers for the first hardware devices from an OS image in the logical layer to a first Electrically Erasable Programmable Read-Only Memory (EEPROM) in the physical layer of the first computing device;

installing the first BIOS in the physical layer of the first computing device which results in the first BIOS being contained in a first chipset to which the first EEPROM is directly connected, the first BIOS and the first EEPROM being external to each other, said first chipset being in the physical layer of the first computing device; and loading the first hardware device drivers from the first EEPROM into the first BIOS during a boot phase for the first computing device.

2. The computer system of claim 1, said method further comprising incorporating a second computing device by cloning the first computing device, said cloning the first computing device resulting in the second computing device being identical to the first computing device, said first computing device being on a first platform, said second computing device being on a second platform that differs from the first platform.

3. The computer system of claim 2, said incorporating the second computing device by cloning the first computing device comprising:

creating a logical layer and a physical layer within the second computing device;

propagating an image of the software OS in the logical layer of the first computing device to the logical layer of the second computing device;

configuring a second BIOS based on installation in the physical layer of the second computing device, said configuring the second BIOS being based on second hardware devices determined to be present in the second computing device and based on determined ways to interact with the second hardware devices;

embedding second hardware device drivers for the second hardware devices in a second EEPROM in the physical layer of the second computing device;

installing the second BIOS in the physical layer of the second computing device which results in the second BIOS being contained in a second chipset to which the second EEPROM is directly connected, the second BIOS and the second EEPROM being external to each other, said second chipset being in the physical layer of the second computing device; and loading the second hardware device drivers from the second EEPROM into the second BIOS during a boot phase for the second computing device.

4. The computer system of claim 3, said second hardware device drivers in the second BIOS containing all platform and device driver specific.

5. The computer system of claim 1, wherein the method further comprises:

loading into the first EEPROM an update for a hardware device driver of the first hardware device drivers.

6. The computer system of claim 1, wherein the method further comprises:

loading into the first EEPROM a hardware device driver for a new hardware device that has been added to a server platform of the improved computing system.

7. The computer system of claim 1, wherein after said loading the first hardware device drivers from the first EEPROM into the first BIOS, the first BIOS comprises a hardware device driver for each hardware device in the first computing device.

8. The computer system of claim 1, said method further comprising:
cloning partitions from a first disk within the first computing device to a second disk within the first computing device, without using any boot media.

9. The computer system of claim 1, said first hardware device drivers in the first BIOS containing all platform and device driver specific information required to pass OS level commands to the first hardware devices.

10. The computer system of claim 1, said method further comprising:
directly connecting the first hardware devices to the first hardware device drivers.

11. A computer program product, comprising a computer readable tangible storage device having a computer readable program code stored therein, said program code configured to be executed by a processor of a computer system to implement a method for configuring an improved computing system containing a first computing device, said method comprising:
creating a logical layer and a physical layer within the first computing device;
installing a software operating system (OS) in the logical layer of the first computing device;
configuring a first basic input/output system (BIOS) based on installation in the physical layer of the first computing device, said configuring the first BIOS being based on first hardware devices determined to be present in the first computing device and based on determined ways to interact with the first hardware devices;
relocating all first hardware device drivers for the first hardware devices from an OS image in the logical layer to a first Electrically Erasable Programmable Read-Only Memory (EEPROM) in the physical layer of the first computing device;
installing the first BIOS in the physical layer of the first computing device which results in the first BIOS being contained in a first chipset to which the first EEPROM is directly connected, the first BIOS and the first EEPROM being external to each other, said first chipset being in the physical layer of the first computing device; and
loading the first hardware device drivers from the first EEPROM into the first BIOS during a boot phase for the first computing device.

12. The computer program product of claim 11, said method further comprising incorporating a second computing device by cloning the first computing device, said cloning the first computing device resulting in the second computing device being identical to the first computing device, said first computing device being on a first platform, said second computing device being on a second platform that differs from the first platform.

13. The computer program product of claim 12, said incorporating the second computing device by cloning the first computing device comprising:
creating a logical layer and a physical layer within the second computing device;
propagating an image of the software OS in the logical layer of the first computing device to the logical layer of the second computing device;
configuring a second BIOS based on installation in the physical layer of the second computing device, said configuring the second BIOS being based on second hardware devices determined to be present in the second computing device and based on determined ways to interact with the second hardware devices;
embedding second hardware device drivers for the second hardware devices in a second EEPROM in the physical layer of the second computing device;
installing the second BIOS in the physical layer of the second computing device which results in the second BIOS being contained in a second chipset to which the second EEPROM is directly connected, the second BIOS and the second EEPROM being external to each other, said second chipset being in the physical layer of the second computing device; and
loading the second hardware device drivers from the second EEPROM into the second BIOS during a boot phase for the second computing device.

14. The computer program product of claim 13, said second hardware device drivers in the second BIOS containing all platform and device driver specific.

15. The computer program product of claim 11, wherein the method further comprises:
loading into the first EEPROM an update for a hardware device driver of the first hardware device drivers.

16. The computer program product of claim 11, wherein the method further comprises:
loading into the first EEPROM a hardware device driver for a new hardware device that has been added to a server platform of the improved computing system.

17. The computer program product of claim 11, wherein after said loading the first hardware device drivers from the first EEPROM into the first BIOS, the first BIOS comprises a hardware device driver for each hardware device in the first computing device.

18. The computer program product of claim 11, said method further comprising:
cloning partitions from a first disk within the first computing device to a second disk within the first computing device, without using any boot media.

19. The computer program product of claim 11, said first hardware device drivers in the first BIOS containing all platform and device driver specific information required to pass OS level commands to the first hardware devices.

20. The computer program product of claim 11, said method further comprising:
directly connecting the first hardware devices to the first hardware device driver.

* * * * *